United States Patent
Willis

(10) Patent No.: US 9,281,685 B2
(45) Date of Patent: Mar. 8, 2016

(54) POWER HARVESTING CIRCUIT AND METHOD FOR SERIALLY COUPLED DC POWER SOURCES

(71) Applicant: Andre P. Willis, Palo Alto, CA (US)

(72) Inventor: Andre P. Willis, Palo Alto, CA (US)

(*) Notice: Subject to any disclaimer, the term of this patent is extended or adjusted under 35 U.S.C. 154(b) by 315 days.

(21) Appl. No.: 14/147,734

(22) Filed: Jan. 6, 2014

(65) Prior Publication Data

US 2014/0145509 A1    May 29, 2014

Related U.S. Application Data

(63) Continuation of application No. 12/796,489, filed on Jun. 8, 2010, now Pat. No. 8,624,436.

(60) Provisional application No. 61/185,264, filed on Jun. 9, 2009.

(51) Int. Cl.
| | |
|---|---|
| H02J 1/10 | (2006.01) |
| H02J 1/14 | (2006.01) |
| G05F 1/67 | (2006.01) |
| H02J 3/38 | (2006.01) |

(52) U.S. Cl.
CPC ... *H02J 1/14* (2013.01); *G05F 1/67* (2013.01); *H02J 1/102* (2013.01); *H02J 3/383* (2013.01); *H02J 3/385* (2013.01); *Y02E 10/563* (2013.01); *Y02E 10/58* (2013.01); *Y02P 80/21* (2015.11); *Y10T 307/685* (2015.04)

(58) Field of Classification Search
CPC ............ H02J 1/14; H02J 3/385; H02J 3/383; H02J 1/102; G05F 1/67
See application file for complete search history.

(56) References Cited

U.S. PATENT DOCUMENTS

| | | | | |
|---|---|---|---|---|
| 5,182,546 A | * | 1/1993 | Shinbori | ............. G06F 1/26 307/65 |
| 2010/0289338 A1 | * | 11/2010 | Stauth | ............. H01L 31/02021 307/77 |

* cited by examiner

*Primary Examiner* — Daniel Cavallari
(74) *Attorney, Agent, or Firm* — Vedder Price, P.C.

(57) ABSTRACT

Circuitry and a method for maximizing power from multiple serially coupled DC power sources. Electrodes provide for serial coupling of multiple DC power sources, capacitive circuitry couples to each one of the electrodes, switching circuitry couples among various ones of the electrodes, and inductive circuitry couples among various others of the electrodes and the switching circuitry.

18 Claims, 11 Drawing Sheets

$T_1 / T_2 = V_{PV2}^{mpp} / V_{PV1}^{mpp}$

POWER HARVESTING CIRCUIT AND METHOD FOR SERIALLY COUPLED DC POWER SOURCES

RELATED APPLICATIONS

This patent application is a continuation of U.S. patent application Ser. No. 12/796,489, filed Jun. 8, 2010, which claims priority from U.S. provisional patent application 61/185,264, filed Jun. 9, 2009, and entitled "Solar Array Inverter with Per-Panel Maximum Power Point Tracking".

FIELD OF THE INVENTION

The present invention relates to circuits and methods for harvesting power from energy conversion circuits, and in particular to such circuits and methods for maximizing power harvested from serially coupled DC power sources.

BACKGROUND

As is well known in the art, central inverter based energy conversion installations use groups of DC power sources connected in series, sometimes called strings. Examples include biomass, chemical, fuel cells and energy storage batteries. However, long strings of such sources have inherent deficiencies. For example, in the case of solar panels, if panels are shaded or obscured, they generate less photocurrent. Panel currents also may be unbalanced for other reasons. Because solar panels in a series string are constrained to all conduct the same current, the weakest one will limit the power harvest from the remaining solar panels, thereby reducing the overall efficiency of the array. For similar reasons, solar panels in a string should be given the same orientation and be of identical type and size. This is not always possible or desirable for aesthetic or other architectural reasons.

Another well-known approach is the microinverter. Microinverters convert solar energy from a single solar panel for feeding to the commercial AC power grid. Although MPPT is done on a per panel basis, thereby maximizing energy harvesting, cost effectiveness of microinverter installations are low due to higher cost per watt and lower efficiency of the electrical conversion.

SUMMARY

In accordance with the presently claimed invention, circuitry and a method are provided for maximizing power from multiple serially coupled DC power sources. Electrodes provide for serial coupling of multiple DC power sources, capacitive circuitry couples to each one of the electrodes, switching circuitry couples among various ones of the electrodes, and inductive circuitry couples among various others of the electrodes and the switching circuitry.

In accordance with one embodiment of the presently claimed invention, circuitry for maximizing power from multiple DC power sources includes: a plurality of electrodes, including a plurality of intermediate electrodes between first and last electrodes, for serially coupling a plurality of DC power sources; capacitive circuitry coupled to each one of the plurality of electrodes; first switching circuitry coupled to at least one of the first and last electrodes and at least one of the plurality of intermediate electrodes; first inductive circuitry coupled between a first portion of the plurality of intermediate electrodes and the first switching circuitry; second switching circuitry coupled to at least one of the first and last electrodes; and second inductive circuitry coupled between a second portion of the plurality of intermediate electrodes and the second switching circuitry.

In accordance with another embodiment of the presently claimed invention, a method for maximizing power from multiple DC power sources includes: serially coupling a plurality of DC power sources with a plurality of electrodes, including a plurality of intermediate electrodes between first and last electrodes; capacitively coupling to each one of the plurality of electrodes; switchably and inductively coupling at least one of the first and last electrodes and a first portion of the plurality of intermediate electrodes; and switchably and inductively coupling at least one of the first and last electrodes and a second portion of the plurality of intermediate electrodes.

BRIEF DESCRIPTION OF THE DRAWINGS

FIG. 5b is a block diagram of an exemplary embodiment of the control unit of FIG. 5a.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function.

Additionally, absent a clear indication otherwise, the term "signal" may refer to one or more currents, one or more voltages, or a data signal. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

As discussed in more detail below, the presently claimed invention maximizes harvesting of power from serially coupled DC power sources. As a means for presenting an example application, the discussion that follows is based on an example of conversion of solar energy into AC current to be fed into commercial power grids, with increased conversion efficiency and cost effectiveness of the conversion. Higher solar energy harvesting is achieved using MPPT for each solar panel. Based on published statistical data, such per-module MPPT contributes to energy harvest gains of 5-25% for typical solar installations. Maintenance of solar installations additionally benefits from continuous monitoring of the performance of each photovoltaic module. A further advantage is an absence of high DC voltage wiring on a roof.

Figure 1:
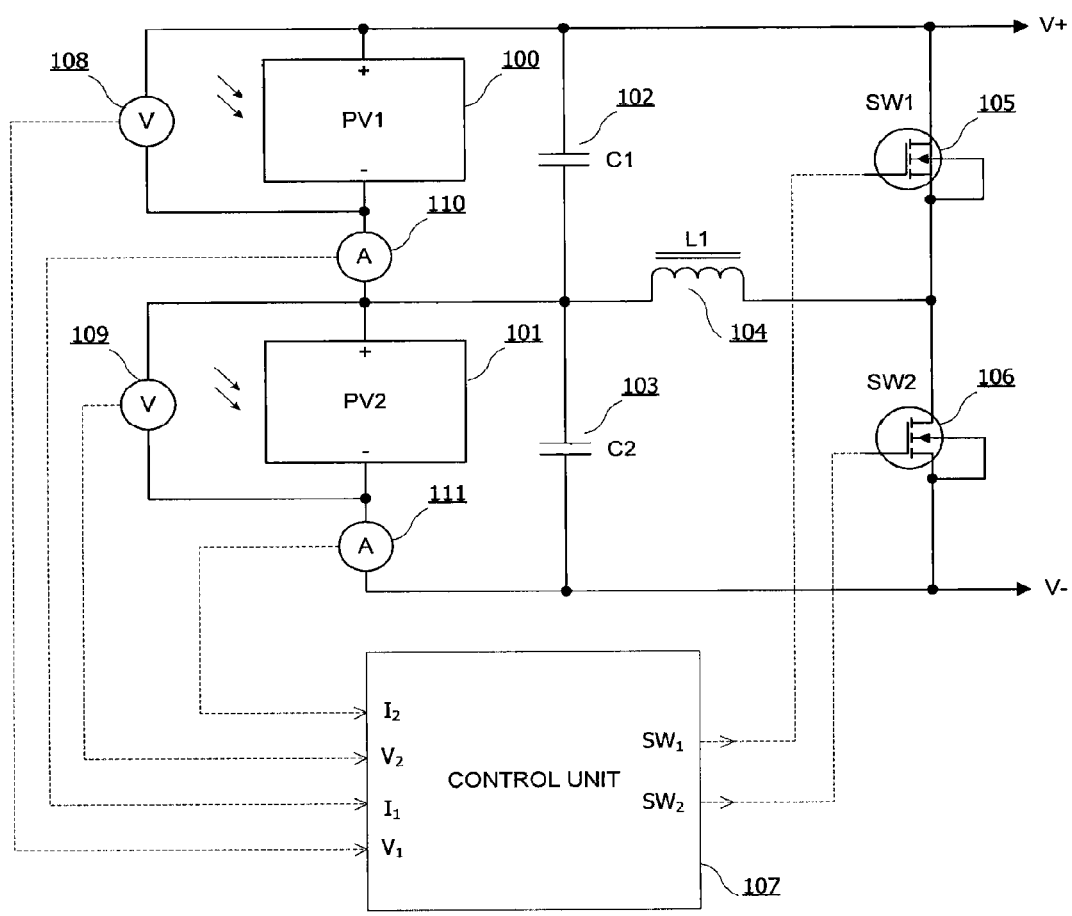
FIG. 1 is a schematic diagram of a power balancer in accordance with one embodiment.

Referring to FIG. 1, an important feature of the presently claimed invention is a power balancer. As shown for this exemplary embodiment, two solar panels PV1 100, PV2 101 are connected in series. If they have identical characteristics, a MPPT converter will find a point at which both panels deliver maximum power. If they are not identical, the weaker panel will limit the power harvested from the stronger one. For example, if one panel PV1 is shaded and produces one ampere less current than the other panel PV2, the power balancer allows a MPPT converter to harvest more power from both panels, e.g., by compensating for the mismatch between the panels.

In accordance with one embodiment, the power balancer includes capacitors C1 102, C2 103, an inductor L1 104, switches SW1 105, SW2 106 (e.g., metal oxide semiconductor field effect transistors (MOSFETs)), and a control unit 107, interconnected substantially as shown. If the switches 105, 106 are operated with a 50% duty cycle, the power balancer will maintain substantially equal voltages on the panels PV1, PV2 independent from the currents produced by the panels PV1, PV2.

Suppose panel PV1 produces current $I_1$ and panel PV2 produces $I_2=I_1+I_{delta}$. If the power balancer is not used, a MPPT converter would receive total current $I_1$ and $I_{delta}$ would not be recovered, or harvested. The purpose of the power balancer is to harvest this additional current $I_{delta}$ from panel PV2 and deliver the extra power associated with it to the MPPT.

Figure 2:
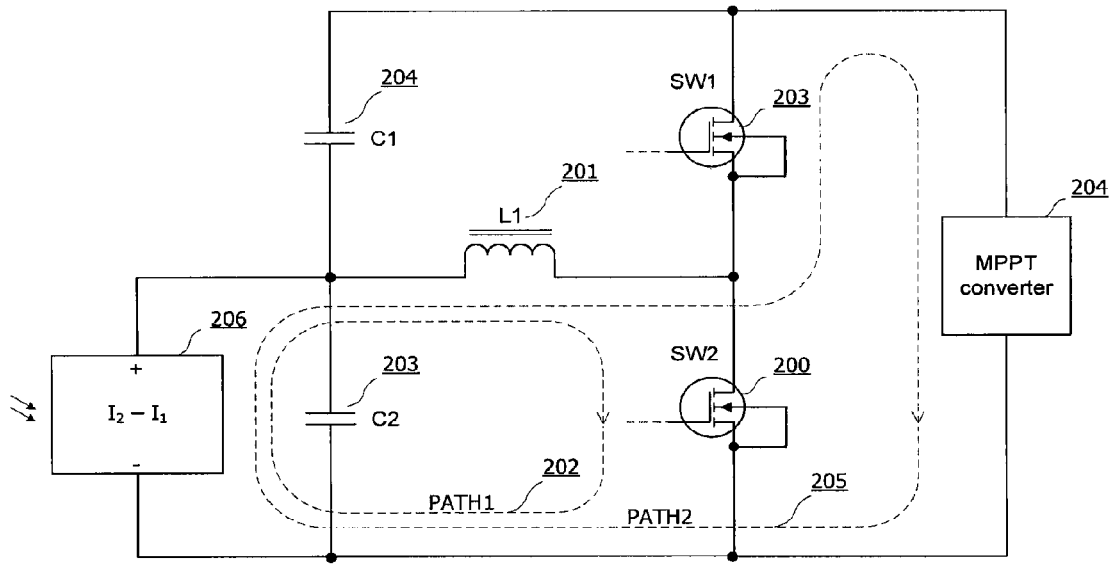
FIG. 2 illustrates operation of the power balancer of FIG. 1.

Referring to FIG. 2, operation of the power balancer can be compared to that of a classic boost converter. During the interval that switch SW2 200 is closed, switch SW1 203 is open and the current difference $I_2-I_1=I_{delta}$ is conducted via PATH1 202 and energy accumulates in the magnetic field of the inductor L1 201. During the interval that switch SW1 203 is closed, switch SW2 200 is open and current is conducted via PATH2 205 and the energy previously stored in the inductor L1 201 is delivered as additional current (having an average magnitude $I_{added}$ related to the difference current $I_{delta}$ of the solar panels PV1, PV2, and ideally equal to $I_{delta}*V_{PV2}^{mpp}/(V_{PV1}^{mpp}+V_{PV2}^{mpp})$ to the MPPT converter 204. Thus the power balancer converts only the unbalanced portion of energy 206 but does not affect the balanced portion of the energy associated with current $I_1$, which goes directly to the MPPT converter 204. Accordingly, the efficiency of energy conversion in the power balancer is substantially proportional to the magnitude of the unbalanced portion of energy 206. The capacitance values of the capacitors C1 204, C2 203 are not critical, but should be selected based on criteria including switching frequency of the switches SW1 105, SW2 106 and maximum allowed panel mismatch. Also, the capacitance values should be sufficiently high to ensure that the voltage ripple across them does not cause the voltages across the solar panels PV1, PV2 to deviate too much from the maximum power point (MPP) voltages of the panels PV1, PV2. This will maintain close to maximum energy harvesting from the solar panels. For a typical crystalline silicon solar panel, 99.5% energy harvest will be achieved if voltage ripples are about 5% (peak-to-peak) from panel MPP voltages.

Figure 4:
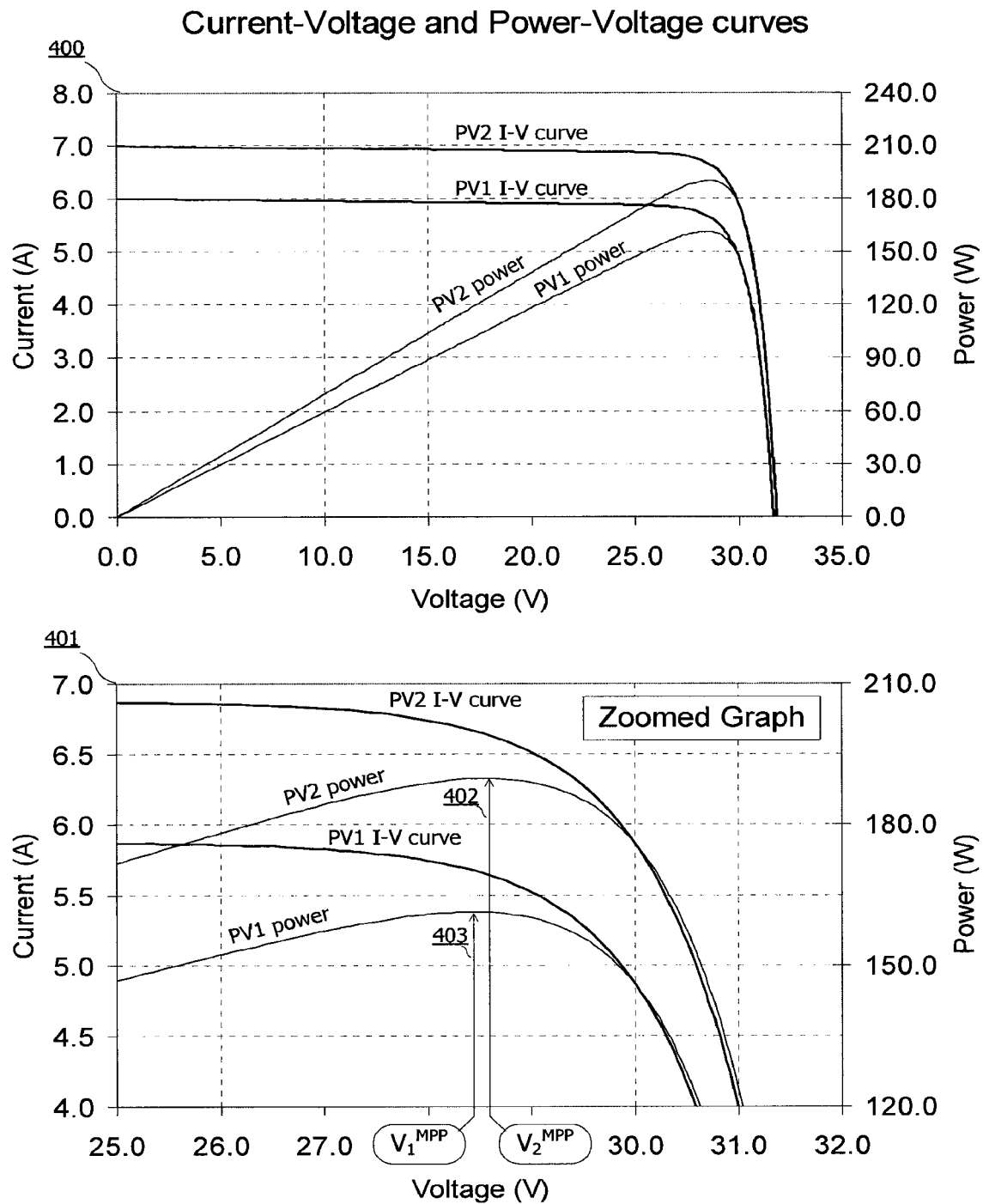
FIG. 4 illustrates full and zoomed graphs of current-voltage and power-voltage characteristic curves for a typical solar panel.

Referring to FIG. 4, further improvement in power harvesting can be obtained by optimizing voltages individually for each panel. Graph 400 illustrates current-voltage and power-voltage characteristic curves for a typical solar panel. For example, the "PV1 I-V curve" corresponds to panel PV1 100, which is shaded, while the "PV2 I-V curve" corresponds to panel PV2 101, which is not shaded. Zoomed graph 401 shows that maximum power for panel PV2 is reached at a slightly higher voltage than for panel PV1, e.g., $V_{PV2}^{mpp}$ 402 and $V_{PV1}^{mpp}$ 403, respectively. This optimization is performed by a secondary (e.g., slower) optimization loop in the control unit 107 (FIG. 1) based on measurements of the voltages $V_1$ 108, $V_2$ 109 and currents $I_1$ 110, $I_2$ 111 (discussed in more detail below).

Figure 3:
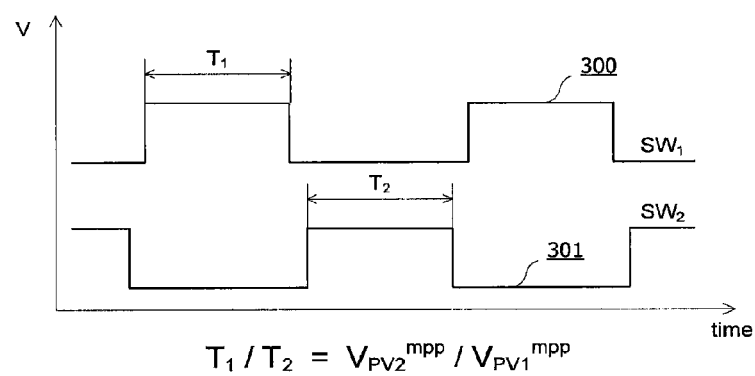
FIG. 3 is an exemplary signal timing diagram for the switch control signals used in the power balancer of FIG. 1.

Referring to FIG. 3, the control unit 107 sets the duty cycle of the control signals for opening and closing the switches SW1, SW2 as follows: $T_1/T_2=V_{PV2}^{mpp}/V_{PV1}^{mpp}$, where $V_{PV1}^{mpp}$ and $V_{PV2}^{mpp}$ are optimal voltages on panels PV1 and PV2, respectively, and $T_1$ and $T_2$ are pulse widths of the control signals $SW_1$ 300, $SW_2$ 301, respectively.

Figure 5:
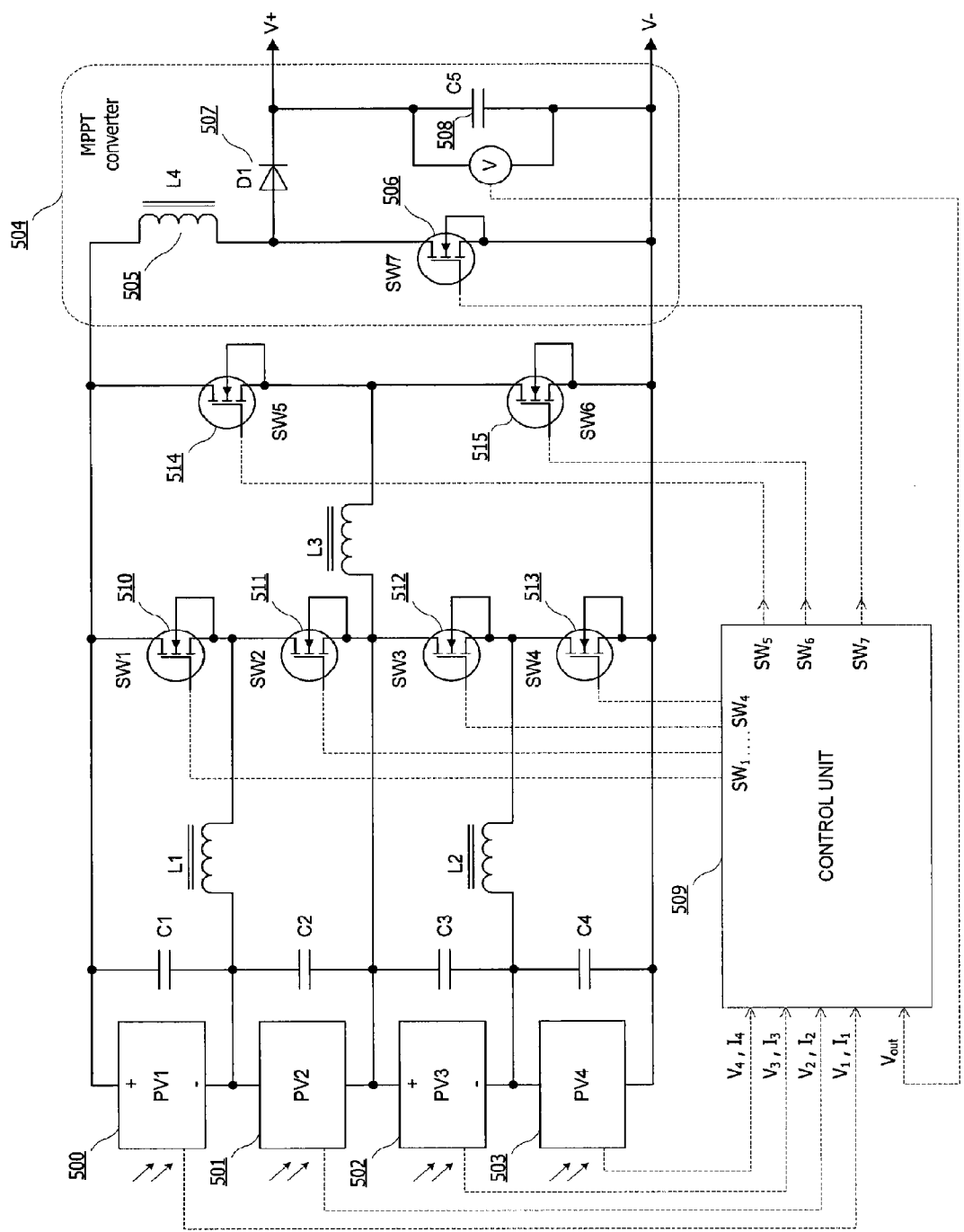
FIG. 5 is a schematic diagram of a power balancer module implementation with multiple power balancers connected in series in accordance with another embodiment.

Referring to FIG. 5, in accordance with another embodiment, a similar technique can be applied to maximize the power harvested from more than two solar panels, e.g., in a multi-balancer power harvest maximizer module implementation having four solar panels PV1 500, PV2 501, PV3 502, PV4 503 connected in series. Three power balancers are used to balance the four panels, which are arranged as two balanced pairs. Power balancing of each pair of solar panels PV1+PV2, PV3+PV4, operates as described above. The third power balancer balances the two pairs of solar panels PV1+PV2, PV3+PV4. As a result, all four panels get balanced and provide power for the MPPT converter 504. The MPPT converter 504 includes an inductor L4 505, a switch SW7 506 (e.g., a MOSFET), a diode D1 507, and a capacitor C5 508, interconnected substantially as shown, which operate as an efficient boost converter.

The control unit 509 implements four optimization loops. The fastest loop tracks the MPP for all four balanced panels by controlling the duty cycle of the switch SW7 506 of the MPPT converter 504. Two slower optimization loops (preferably identical) optimize the individual solar panels within the solar panel pairs. Solar panel pair PV1+PV2 is controlled by the switching duty cycles of their switches SW1 510, SW2 511, while solar panel pair PV3+PV4 is controlled by the switching duty cycles of their switches SW3 512, SW4 513. The slowest optimization loop balances the solar panel pairs PV1+PV2, PV3+PV4 as a group by controlling the switching duty cycles of its switches SW5 514, SW6 515.

Figure 5A:
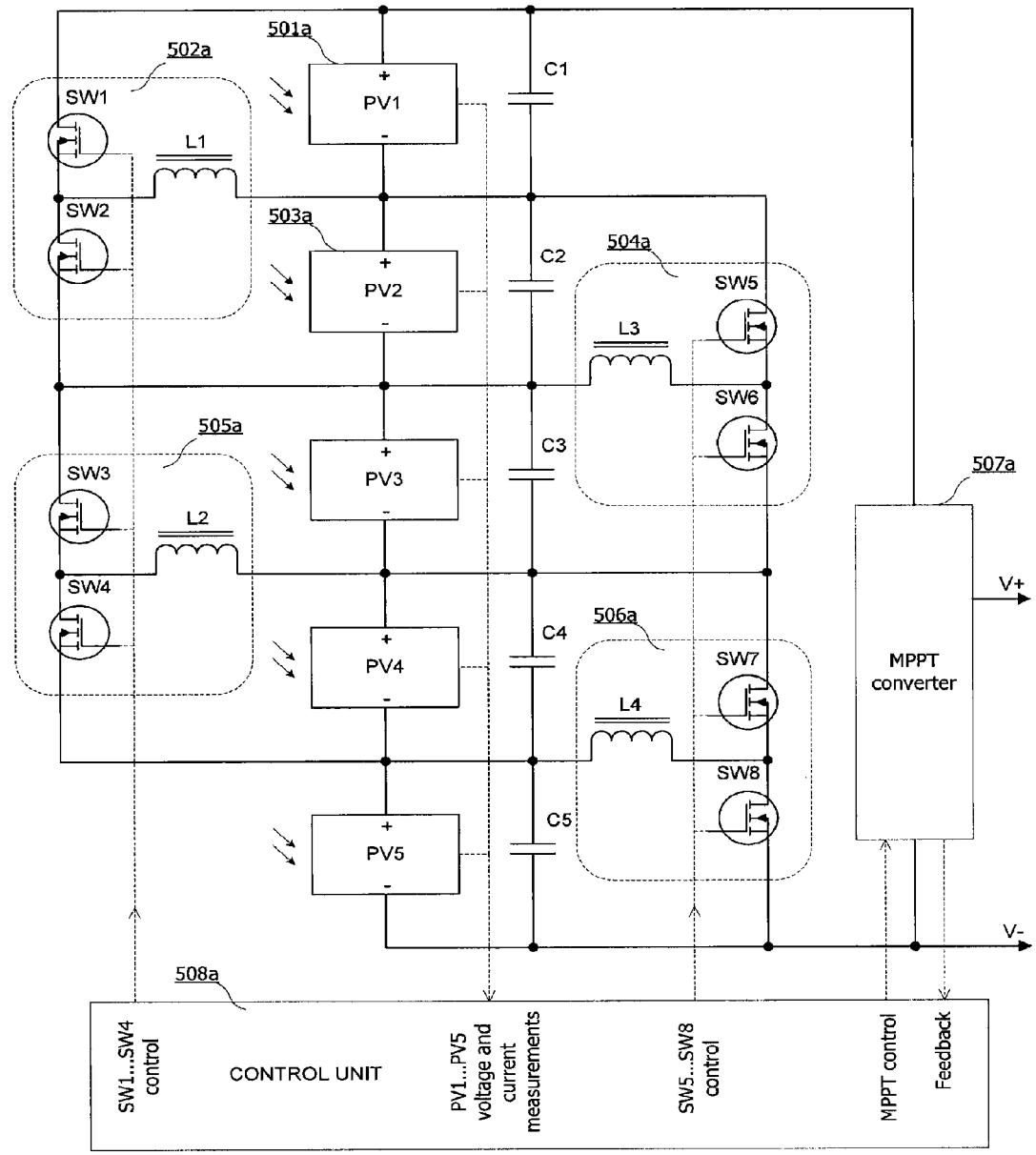
FIG. 5a is a schematic diagram of a power balancer module implementation with multiple power balancers connected in series in accordance with another embodiment.

Referring to FIG. 5a, in accordance with another embodiment, a power balancer for multiple solar panels can implemented for an odd number of solar panels. For example, five solar panels can be balanced by four power balancer circuits, arranged in a way that reduces the maximum voltage applied to any single power balancer. In this implementation, a single power balancer circuit is used to balance each electrically adjacent pair in the series-connected solar panels (as discussed above), where each solar panel pair is balanced by interleaving power balancer circuits as shown. Operation of the interleaved power balancers is such that the optimized voltage ratios are maintained among all solar panels in the series. The first power balancer 502a which includes two switches SW1, SW2 and maintains a ratio of voltages on its associated solar panels PV1, PV2 substantially equal to the inverse ratio of the duty cycle of the states of the switches SW1, SW2. Similarly, the second power balancer 504a defines the voltage ratio between its associated solar panels PV2, PV3, and so forth for all panels in the chain. Thus the five solar panels PV1, PV2, PV3, PV4, PV5 have their respective voltage ratios defined by four power balancer circuits 502a, 504a, 505a, 506a, and provide power to the MPPT converter 507a as discussed above. In the general case of this implementation, N solar panels connected in series can be balanced by N−1 power balancer circuits.

Figure 5B:
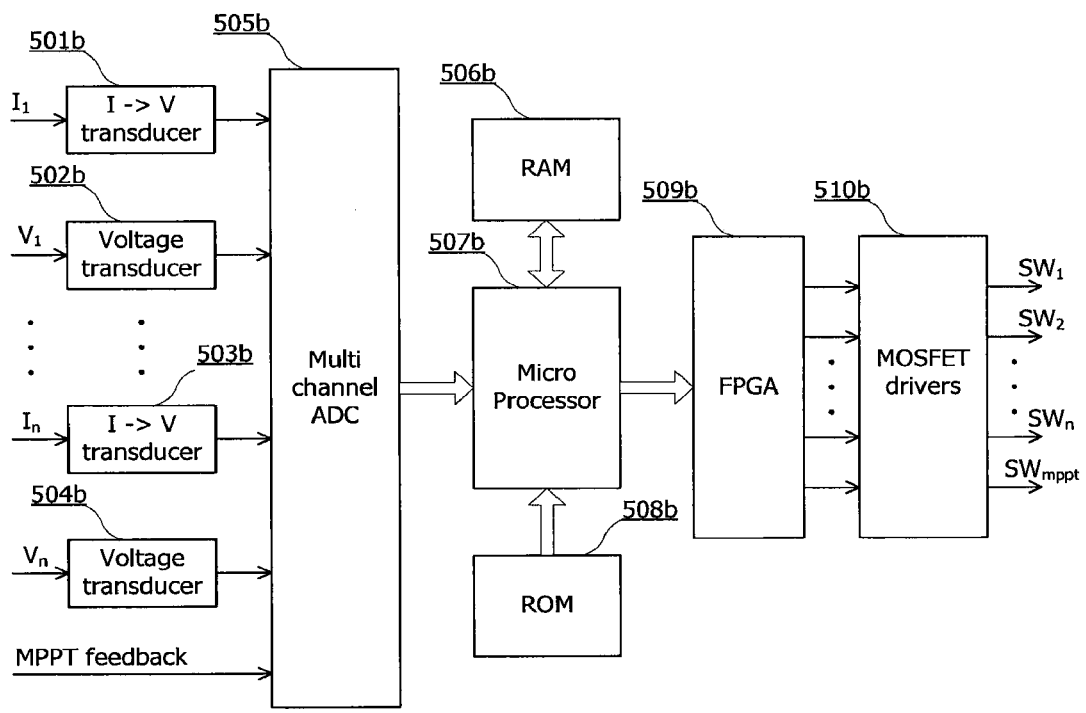

Referring to FIG. 5b, in accordance with one embodiment, the control units 107, 509a, 508a of FIGS. 1, 5 and 5a can be implemented substantially as shown. Voltage and current sensing of the solar panel voltages and currents, respectively, are performed using transducers 501b, 502b, 503b, 504b provide analog voltages proportional to the solar panel voltages and currents for conversion by an analog-to-digital converter (ADC) 505b. The MPPT feedback voltage is also digitized by the ADC 505b. The ADC 505b supplies these converted signals as digitized measurement data to a microprocessor 507b, which, in concert with its associated data memory 506b (e.g., random access memory (RAM)) and program memory 508b (e.g., read only memory (ROM)), performs computational algorithms (discussed in more detail below). The results are written to switch pulse forming logic 509b, e.g., implemented using a field programmable gate array (FPGA). Output pulses from the switch pulse forming logic 509b is converted to appropriate levels by signal drivers 510b (e.g., MOSFET drivers) for driving the power balancer and MPPT converter switches, as discussed above.

Figure 5C:
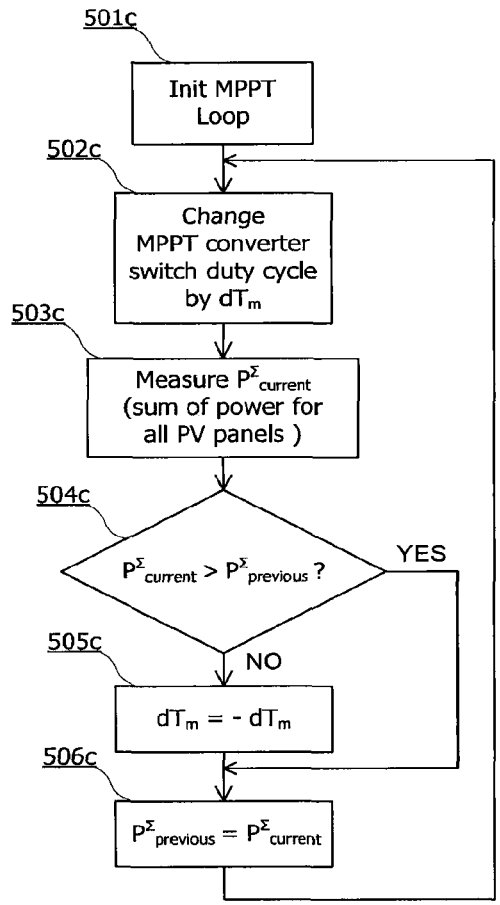
FIG. 5c is a flowchart of exemplary embodiments of processes running in the control unit of FIG. 5b.
Figure 5C:
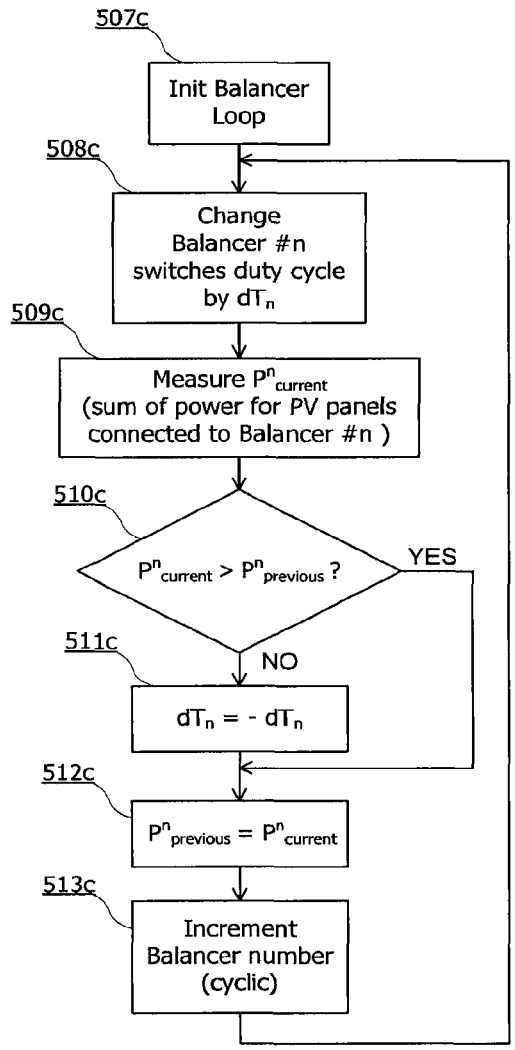

Referring to FIG. 5c, in accordance with exemplary embodiments, operation of the control units, e.g., as depicted in FIG. 5b, can proceed as shown. Following initialization 501c of the MPPT converter control loop, the switch control pulse width is increased 502c by a small increment of dTm, after which the sum of the power for all solar panels is calculated 503c, according to the formula $$P_{current} = V1*I1 + V2*I2 + \ldots + Vn*In$$

where: Vn=voltage from solar panel N
In=current from solar panel N

This newly computed power $P_{current}$ is compared 504c with the previously stored power $P_{previous}$. If the current power $P_{current}$ is P higher than the previous power $P_{previous}$, the stored value for power is updated 506c with the current value, and the loop continues. Otherwise, the sign of the switch control pulse increment dTm is reversed 505c, and the loop continues.

Similarly, a slower power balancer control loop is initialized 507c, followed by a change 508c in the balancer switch timing. The timing relationship between two switches in a power balancer (FIG. 3) is altered by increasing the duty cycle T1 of one switch control signal $SW_1$ by an amount dTn and decreasing the duty cycle T2 of the other switch control signal $SW_2$ by the same amount dTn. Power is measured 509c as before, but only for those solar panels attached to the power balancer. This value $P_{current}$ is compared 510c with the previously stored power $P_{previous}$. If the current power $P_{current}$ is higher than the previous power $P_{previous}$, the stored value for power is updated 512c with the current value, and the loop continues 513c for the next power balancer. Otherwise, the sign of the switch control pulse increment dTn is reversed 511c, and the loop continues, as discussed above.

Figure 6:
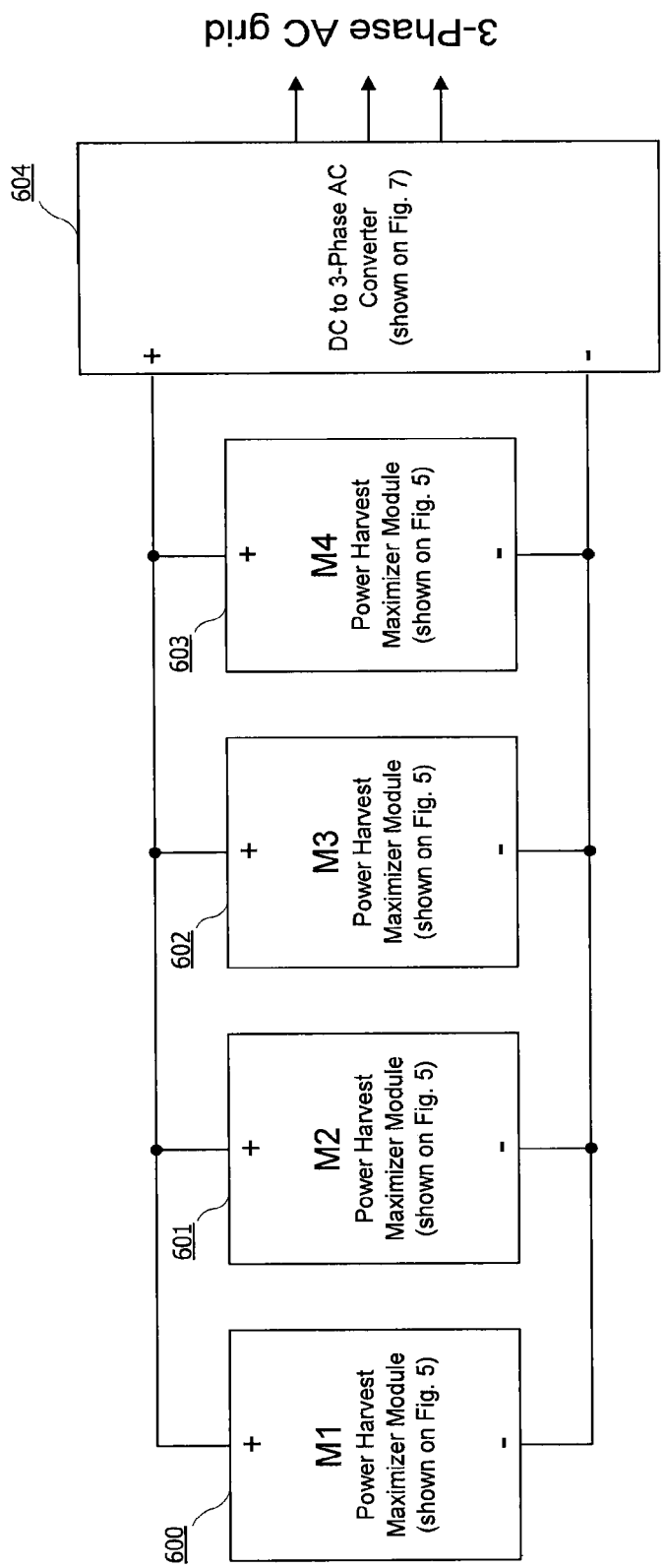
FIG. 6 is a block diagram of four power balancer modules coupled to provide a DC current to be converted into AC current by a DC/AC converter in accordance with another embodiment.

Referring to FIG. 6, the output of a MPPT converter acts as a current source, thereby allowing several MPPT converters to be connected in parallel, e.g., four parallel-connected MPPT converters M1 600, M2 601, M3 602, M4 603 (identified as "Power Harvest Maximizer Modules"). The DC current generated by them is converted into AC current by a DC/AC converter 604.

Figure 6A:
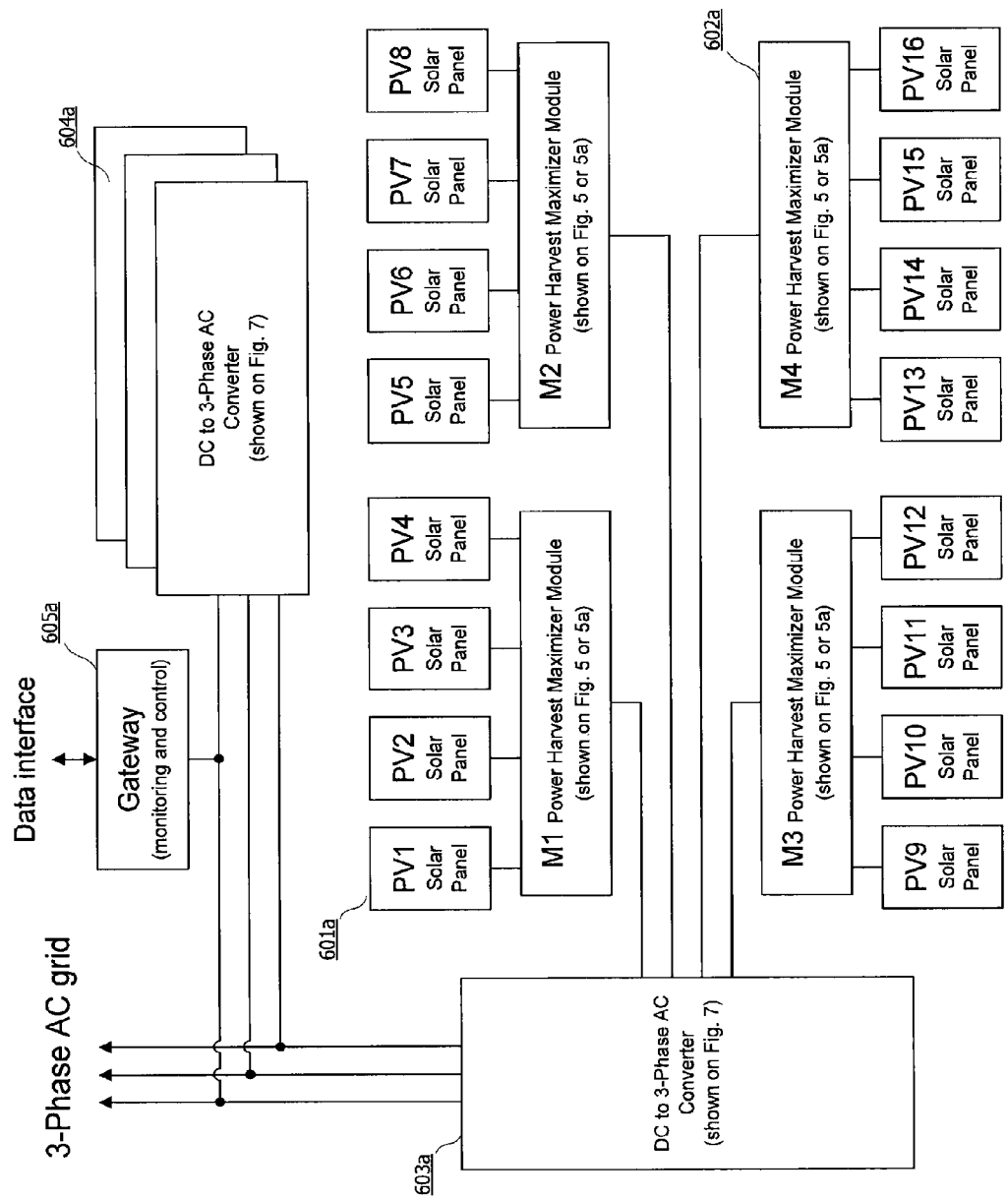
FIG. 6a is a block diagram of a distributed inverter system architecture in accordance with another embodiment.

Referring to FIG. 6a, the stand-alone nature of the power harvest maximizer module makes it practical to separate this function physically from the grid-connected DC-to-AC inverter function. This allows a distributed inverter system architecture, as shown. In this implementation, two or more solar panels 601a are connected to and optimized by one or more power harvest maximizer modules 602a. Each power harvest maximizer module serves one or more solar panels and includes one MPPT converter and an appropriate number of balancers for the number of solar panels connected. Two or more power harvest maximizer modules are then connected to the DC-to-3-phase AC converter 603a. A monitoring and control gateway interface 605a provides a means for monitoring of the system via power line communications and provides a communication bridge to allow local and remote interaction with the power system for status monitoring and control.

Figure 7:
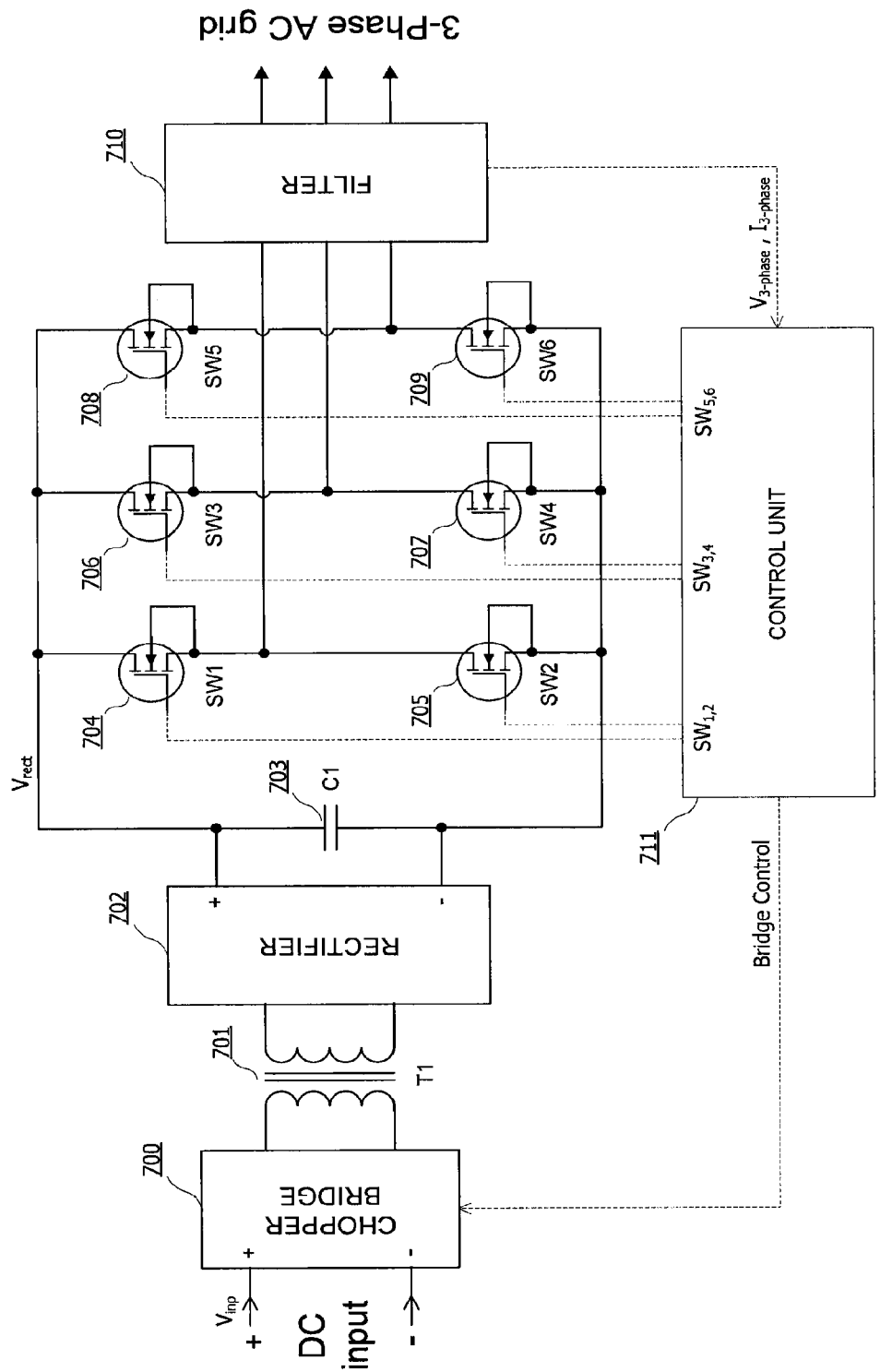
FIG. 7 is a schematic diagram of a DC/AC converter for a 3-phase power grid in accordance with another embodiment.

Referring to FIG. 7, shows an implementation of a DC/AC converter for providing power to a 3-phase power grid. The DC current goes into a chopper 700, which produces a high frequency (e.g., >20 KHz) voltage for a step-up transformer T1 701. The galvanically isolated output of the transformer Ti is rectified with a rectifier 702 to produce a DC voltage across a filter capacitor C1 703. Six switches SW1 704, SW2 705, SW3 706, SW4 707, SW5 708, SW6 709 (e.g., MOSFETs or insulated gate bipolar transistors (IGBTs)) produce a 3-phase AC voltage which is filtered by a filter circuit 710 for delivery to a commercial 3-phase power grid.

A control unit 711 monitors the 3-phase grid voltage $V_{3-phase}$ and current $I_{3-phase}$, and generates control pulses for the switches SW1, SW2, SW3, SW4, SW5, SW6 to deliver energy to the grid with proper phases. If galvanic isolation is not required for standards compliance, the DC input voltage $V_{inp}$ can be applied directly to the filter capacitor 703, thereby eliminating the need for the chopper 700, transformer T1 701 and rectifier 702.

The above architecture advantageously maximizes efficiency of DC/AC power conversion by keeping the conversion ratio $V_{rect}/V_{inp}$ constant. As a result, the input DC voltage $V_{inp}$ tracks the grid voltage. The rectified DC voltage $V_{rect}$ across the switches SW1, SW2, SW3, SW4, SW5, SW6 is kept at the minimal level required to provide an undistorted output waveform for the current grid voltage. In this architecture, matching of varying solar energy and varying grid voltage is performed in one place, i.e., the MPPT converter 504 (FIG. 5).

Figure 7A:
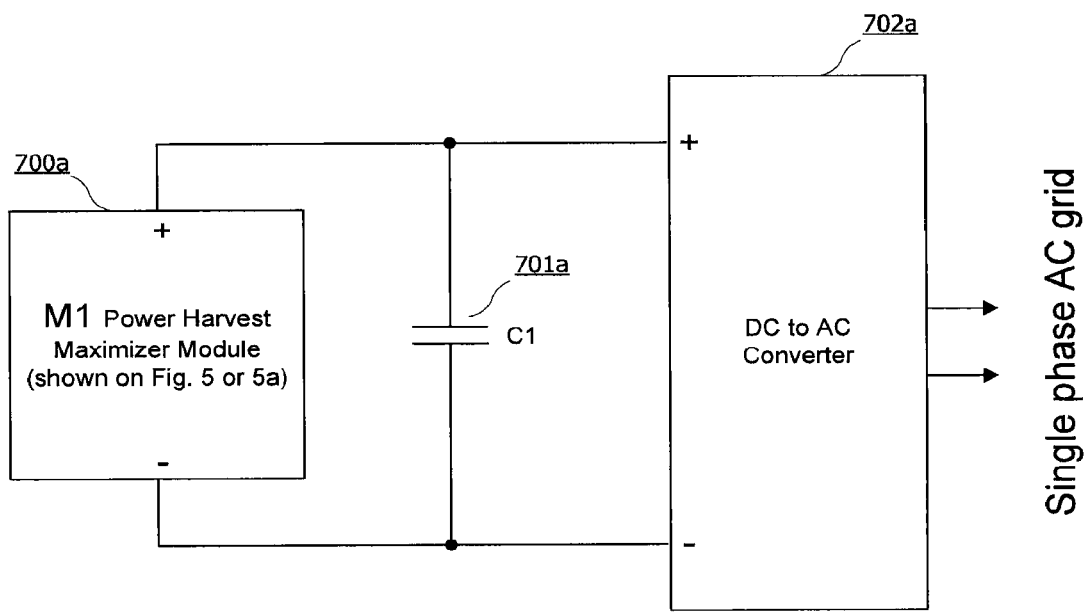
FIG. 7a is a schematic diagram of a DC/AC converter for a single-phase power grid in accordance with another embodiment.

Referring to FIG. 7*a*, in accordance with another embodiment, the power harvest maximizer can be used in single phase power inverters. As discussed above, the solar panels provide a continuous flow of energy. Because energy cannot be continuously supplied to the single phase grid, an energy storage buffer is required. Such energy storage can be implemented as a capacitor 701*a*, as shown. The sum of the voltage across the series-connected, balanced solar panels applied to the MPPT boost converter results in a high power harvest maximizer module output voltage. Because energy stored in the capacitor is proportional to the square of the applied voltage, this results in a corresponding reduction in the physical size of the capacitive storage element compared to existing single solar panel inverters. Voltage ripple present across the capacitor 701*a* can be isolated from the solar panels by an appropriate power harvest maximizer module control algorithm, further reducing the size of the capacitor 701*a*.

Based upon the foregoing discussion, in accordance with the presently claimed invention, it can be seen that: a power balancer is provided that improves energy harvesting from serially coupled DC power sources such as solar panels by compensating mismatches between the solar panels; such a power balancer can be used to balance more than two solar panels; the MPPT converter, which acts as a current source, allows multiple converters to be connected in parallel for summing their output currents; a highly efficient architecture is provided for a DC/AC power converter that compensates for varying solar energy levels and varying grid voltages in a single place in the energy conversion chain; and multi-loop control algorithms are provided for optimizing system performance.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including circuitry for maximizing power from multiple DC power sources, comprising:
    a plurality of electrodes, including a plurality of intermediate electrodes between first and last electrodes, for serially coupling a plurality of DC power sources;
    capacitive circuitry coupled to each one of said plurality of electrodes;
    first switching circuitry coupled to at least one of said first and last electrodes and at least one of said plurality of intermediate electrodes;
    first inductive circuitry coupled between a first portion of said plurality of intermediate electrodes and said first switching circuitry;
    second switching circuitry coupled to at least one of said first and last electrodes; and
    second inductive circuitry coupled between a second portion of said plurality of intermediate electrodes and said second switching circuitry.

2. The apparatus of claim 1, wherein said first and second portions of said plurality of intermediate electrodes are mutually exclusive.

3. The apparatus of claim 1, wherein said first portion of said plurality of intermediate electrodes comprises alternating ones of said plurality of intermediate electrodes.

4. The apparatus of claim 1, wherein said second portion of said plurality of intermediate electrodes comprises alternating ones of said plurality of intermediate electrodes.

5. The apparatus of claim 1, wherein:
    said first portion of said plurality of intermediate electrodes comprises first alternating ones of said plurality of intermediate electrodes;
    said second portion of said plurality of intermediate electrodes comprises second alternating ones of said plurality of intermediate electrodes; and
    said first and second alternating ones of said plurality of intermediate electrodes are mutually exclusive.

6. The apparatus of claim 1, wherein:
    said plurality of electrodes comprises a plurality of N electrodes;
    said capacitive circuitry comprises a plurality of N−1 capacitances; and
    each one of said plurality of N−1 capacitances is coupled between respective successive pairs of said plurality of N electrodes.

7. The apparatus of claim 1, wherein said first switching circuitry comprises a first plurality of switching devices serially coupled between said first electrode and one of:
    said last electrode; and
    a first one of said plurality of intermediate electrodes.

8. The apparatus of claim 7, wherein said second switching circuitry comprises a second plurality of switching devices serially coupled between said last electrode and one of:
    said first electrode; and
    a second one of said plurality of intermediate electrodes.

9. The apparatus of claim 1, wherein said first inductive circuitry comprises a first plurality of inductances coupled between first alternating pairs of said plurality of electrodes and said first switching circuitry.

10. The apparatus of claim 9, wherein said second inductive circuitry comprises one or more inductances coupled between second alternating pairs of said plurality of electrodes and said second switching circuitry.

11. A method for maximizing power from multiple DC power sources, comprising:
    serially coupling a plurality of DC power sources with a plurality of electrodes, including a plurality of intermediate electrodes between first and last electrodes;
    capacitively coupling to each one of said plurality of electrodes;
    switchably and inductively coupling at least one of said first and last electrodes and a first portion of said plurality of intermediate electrodes; and
    switchably and inductively coupling at least one of said first and last electrodes and a second portion of said plurality of intermediate electrodes.

12. The method of claim 11, wherein said first and second portions of said plurality of intermediate electrodes are mutually exclusive.

13. The method of claim 11, wherein said first portion of said plurality of intermediate electrodes comprises alternating ones of said plurality of intermediate electrodes.

14. The method of claim 11, wherein said second portion of said plurality of intermediate electrodes comprises alternating ones of said plurality of intermediate electrodes.

15. The method of claim 11, wherein:
- said first portion of said plurality of intermediate electrodes comprises first alternating ones of said plurality of intermediate electrodes;
- said second portion of said plurality of intermediate electrodes comprises second alternating ones of said plurality of intermediate electrodes; and
- said first and second alternating ones of said plurality of intermediate electrodes are mutually exclusive.

16. The method of claim 11, wherein said capacitively coupling to each one of said plurality of electrodes comprises capacitively coupling between respective successive pairs of said plurality of electrodes.

17. The method of claim 11, wherein said switchably and inductively coupling at least one of said first and last electrodes and a first portion of said plurality of intermediate electrodes comprises switchably and inductively coupling among said first electrode, electrodes between first alternating pairs of said plurality of electrodes, and one of:
- said last electrode; and
- a first one of said plurality of intermediate electrodes.

18. The method of claim 17, wherein said switchably and inductively coupling at least one of said first and last electrodes and a second portion of said plurality of intermediate electrodes comprises switchably and inductively coupling among said last electrode, electrodes between second alternating pairs of said plurality of electrodes, and one of:
- said first electrode; and
- a second one of said plurality of intermediate electrodes.

\* \* \* \* \*